(12) United States Patent
Pascouet

(10) Patent No.: US 6,364,569 B1
(45) Date of Patent: Apr. 2, 2002

(54) DYNAMIC SYSTEM FOR MAINTAINING SPACING BETWEEN TWO OR MORE OBJECTS

(75) Inventor: Adrien P. Pascouet, Houston, TX (US)

(73) Assignee: Seismic Systems, Inc., Houston, TX (US)

( * ) Notice: Subject to any disclaimer, the term of this patent is extended or adjusted under 35 U.S.C. 154(b) by 0 days.

(21) Appl. No.: 09/428,806

(22) Filed: Oct. 28, 1999

Related U.S. Application Data

(63) Continuation of application No. 08/972,562, filed on Nov. 18, 1997, now Pat. No. 5,980,148.

(51) Int. Cl.$^7$ ............................................... F16G 11/00
(52) U.S. Cl. ........................ 403/337; 403/119; 403/76
(58) Field of Search ................................. 403/359, 119, 403/76, 77, 120, 385, 389, 337; 181/110–120; 367/144–153, 173, 141; 343/874, 877, 890

(56) References Cited

U.S. PATENT DOCUMENTS

| 2,184,729 A | * | 12/1939 | Bailey | 343/874 |
| 2,778,015 A | * | 1/1957 | Chu | 343/874 |
| 4,635,747 A | * | 1/1987 | Bird, Sr. et al. | 181/120 |
| 4,970,046 A | * | 11/1990 | Dolengowski | 367/153 |
| 5,469,404 A | * | 11/1995 | Barber et al. | 181/115 |
| 5,475,188 A | * | 12/1995 | Cappelen et al. | 181/120 |
| 5,709,497 A | * | 1/1998 | Zoch et al. | 403/389 |

* cited by examiner

Primary Examiner—Lynne H. Browne
Assistant Examiner—Aaron Dunwoody
(74) Attorney, Agent, or Firm—Sankey & Luck L.L.P.

(57) ABSTRACT

A system for maintaining a spaced relationship between two energetic sources is disclosed, which system including in a preferred embodiment a clamping means securable to the energetic sources, spacing means disposed between these sources, a pivot mechanism coupled to the spacing means and pivotally engageable to the clamping means, and a shock absorption mechanism coupled to the spacing mechanism and adapted to resiliently deform.

27 Claims, 5 Drawing Sheets

DYNAMIC SYSTEM FOR MAINTAINING SPACING BETWEEN TWO OR MORE OBJECTS

CROSS REFERENCES TO RELATED APPLICATION

This application is a continuation to application Ser. No. 08/972,562 as filed on Nov. 18, 1997 and which issued as U.S. Pat. No. 5,980,148 on Nov. 9, 1999.

BACKGROUND OF THE INVENTION

1. Field of the Invention

The present invention relates to a means to maintain the position of two or more energetically moveable objects in a spaced relation vis-a-vis each other. More specifically, the present invention in a preferred embodiment relates to a system to maintain two marine seismic sources in a preferred, spaced orientation during continuous operation.

2. Description of the Prior Art

Marine seismic exploration often utilizes seismic sources, airguns or waterguns, pulled behind a boat over submarine horizons of perceived interest. Upon actuation, these sources create a strong, primary pressure pulse which is useful in interpreting the strata comprising the sea floor.

To enhance this primary pulse, and hence advance the geological interpretation of the sea floor, it has become common practice to simultaneously fire a number of these seismic sources. In this connection, it has been discovered that marine seismic sources selectively positioned with respect to each other optimize the creation of the primary pulse while minimizing the creation of undesired secondary pulses. This optimization, generally known as the "cluster effect," relies on spacing between the sources given the parameters of volume, pressure, and depth.

In practice, however, realization of the benefits of the "cluster effect" has been difficult since seismic sources, due to the strong energy pulses created during actuation and recoil, are prone to substantial and energetic movements with respect to each other. Furthermore, the air bubbles created upon actuation of the marine acoustic generator ultimately collapses, forcing the sources together and thereby inducing significant damage on the gun lines and peripheral equipment.

Prior mechanical clamping systems have been designed to address this issue. Such clamping systems, however, if strong enough to prevent substantial movement of the sources with respect to each other, have generally been bulky and contribute to substantial drag on the towing source. In some instances, this drag may be of a sufficient magnitude as to foreclose their use as a towed array altogether.

Systems which are not as massive, and hence more streamlined, having been generally unable to achieve the rigidity and spacing necessary for optimization of the "cluster effect". Moreover, such systems are readily damaged through consecutive recoils of the seismic sources during operation.

SUMMARY OF THE INVENTION

The present invention addresses the above identified and other disadvantages of prior art coupling systems by providing a streamlined system which secures energetic sources in a fixed relation with respect to each other. Such a system is therefore suited for use as a towed seismic source. The present system also allows for controlled, resilient deformation during actuation of the seismic source, thereby enhancing the useful life of the system.

In a general embodiment, the present invention comprises coupling means securable to one or more energetic sources, e.g., marine seismic sources; spacing means securable to the coupling means so as to maintain the energetic sources in a substantially fixed relationship with respect to each other; rotation means; and, a shock absorption means disposed between the coupling means and the spacing means so as to allow controlled resilient deformation of the system without premature deterioration and/or fatigue of its various components.

The spacing system of the present invention orients two or more energetic sources at a precise distance from each other and at an optimum separation distance to accentuate the primary pulse and minimize secondary pressure pulses. This system also serves to prevent significant displacement between the sources during actuation while absorbing energy caused, in the instance of a marine acoustic source, by the explosive force, recoil and ultimate implosion of the bubble.

The present invention presents a number of advantages over prior art systems. One such advantage is that the system presents a low profile and hence low drag when used as a towed source. This is significant where the system is to be towed through the water such as is in the case of a marine acoustic generator.

Another advantage of the present invention is that the system demonstrates greatly reduced wear due to rotation means shock absorption build into the system through controlled, resilient deformation. Yet another advantage of the present invention is its ready adaptation to a conventional energy source, which adaptation facilitating inspection and disassembly.

Other benefits and advantages will become apparent through a review of the detailed description of the preferred embodiment.

DETAILED DESCRIPTION OF THE PREFERRED EMBODIMENT

Various embodiments of the present invention may be seen by reference to FIGS. 1–9.

Figure 1:
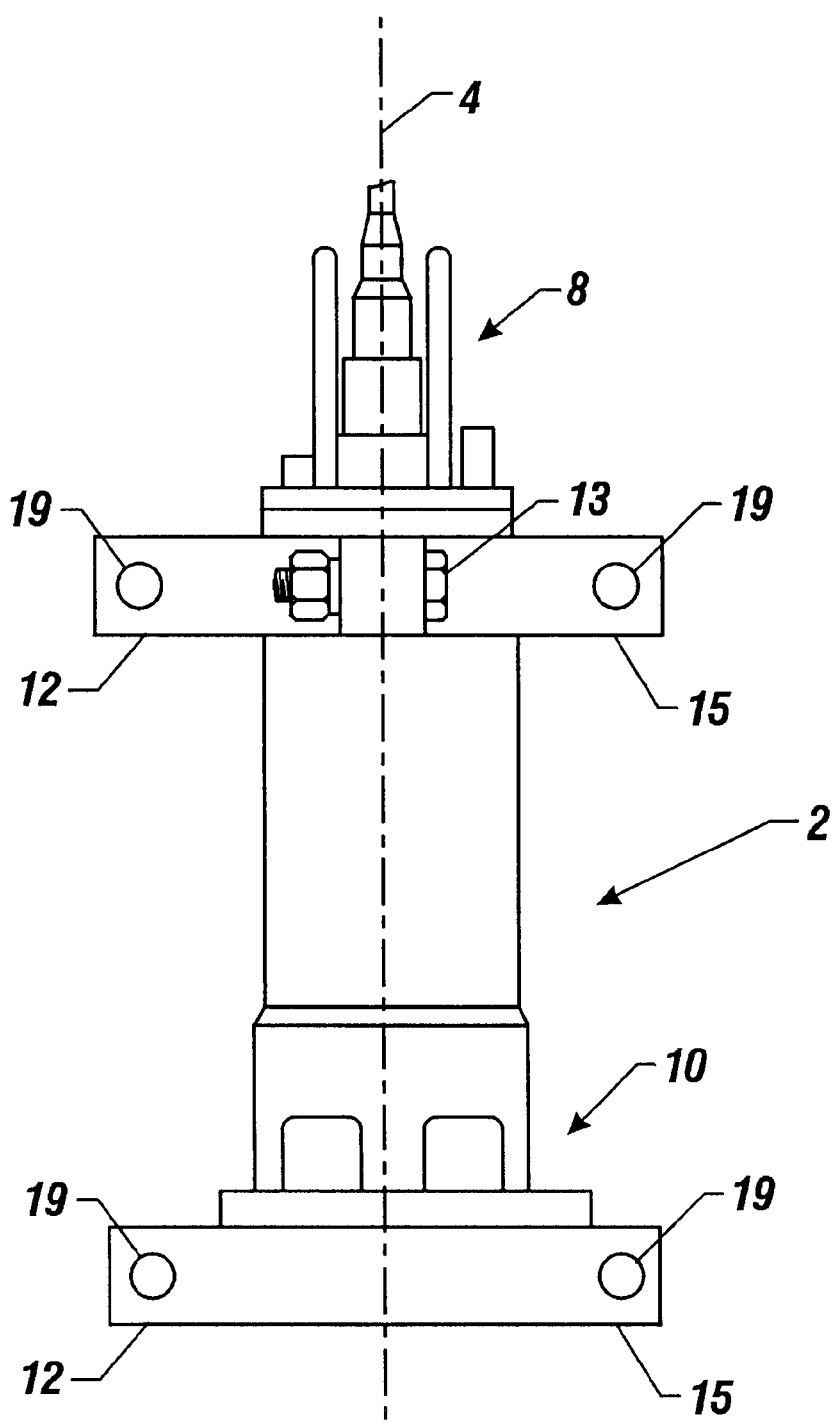
FIG. 1 discloses a top view of a typical marine acoustic generator equipped with coupling points for the system of the present invention.
Figure 2:
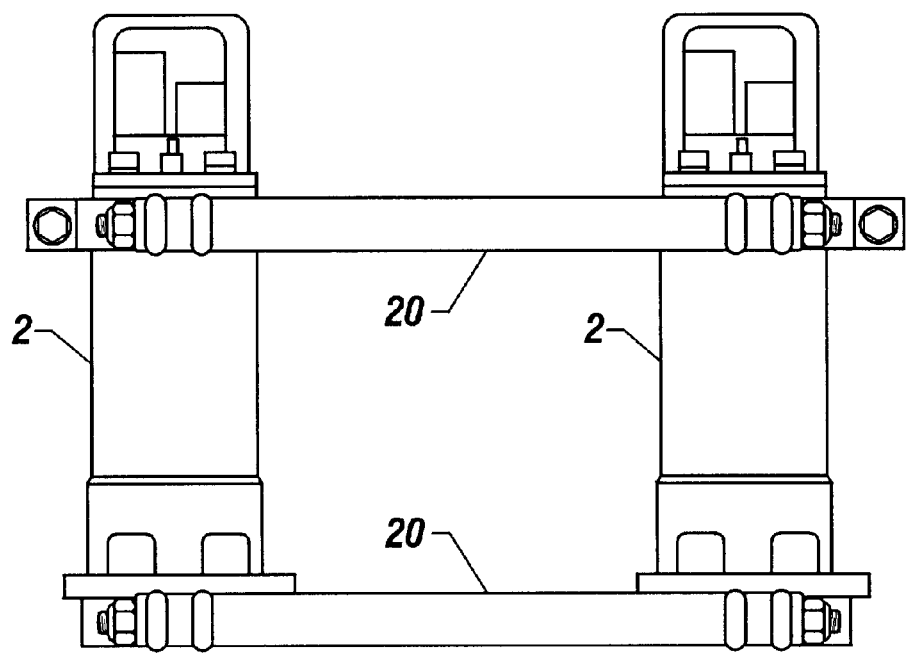
FIG. 2 discloses a top view of one preferred embodiment of the invention.
Figure 3:
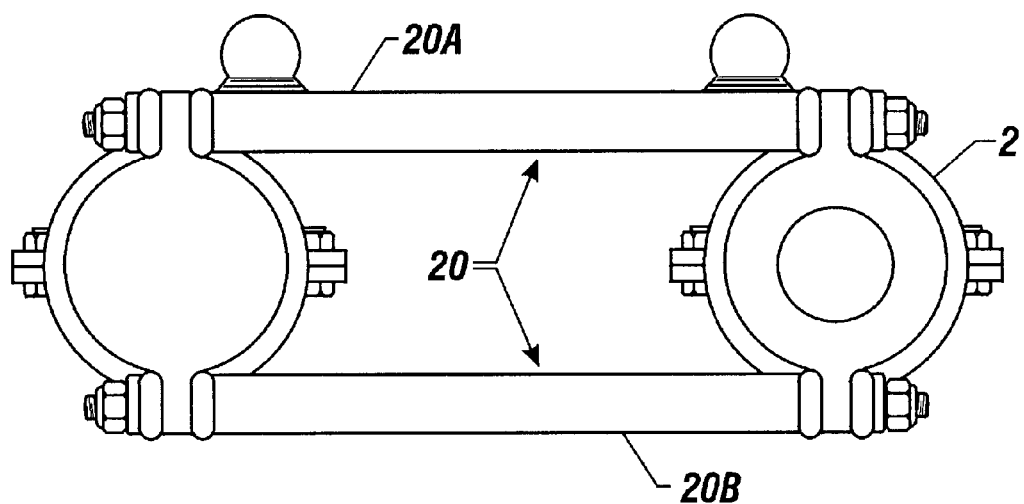
FIG. 3 discloses a side view of the embodiment illustrated in FIG. 2.
Figure 4:
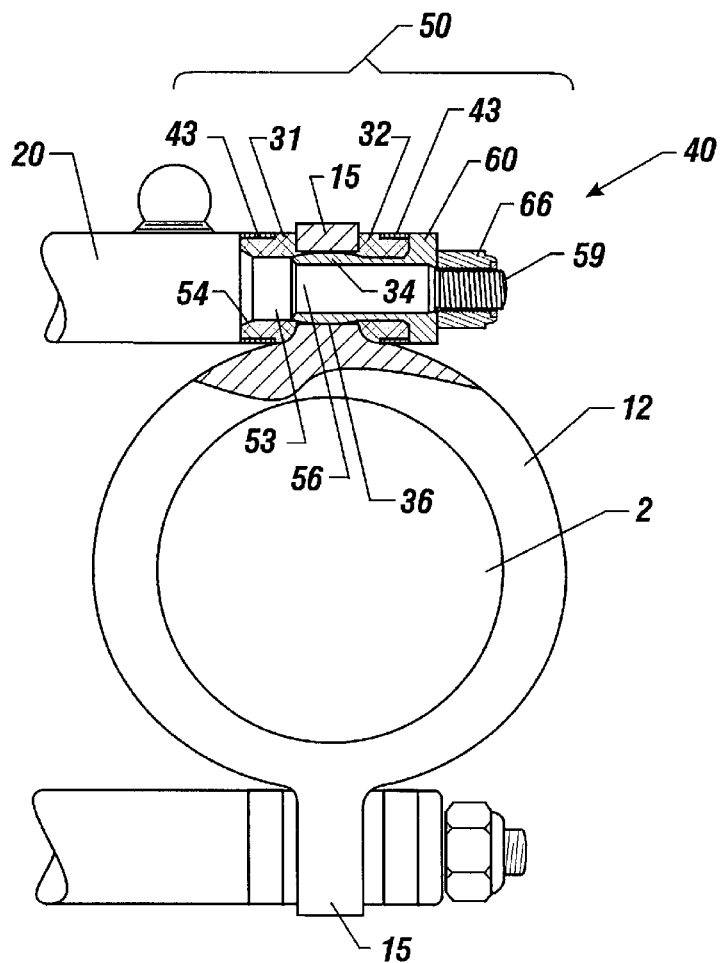
FIG. 4 illustrates a cutaway view of a preferred embodiment of the shock absorbing means of the invention.

FIG. 1 illustrates a top view of a conventional marine seismic generator 2 which defines a longitudinal axis 4 therethrough and a first 8 and second 10 end. Conventional air hose and peripheral equipment (not shown) are coupled to end 8 of generator 2. Seismic generators of the type illustrated at FIG. 1 are specifically adapted to operate in a marine environment when being towed at depth, either singularly or in combination with other sources. Such sources therefore generally incorporate a coupling means comprising a bracketing arrangement which is usually adapted to be secured to opposite ends of the seismic source via conventional fasteners.

The present system contemplates the use of brackets 12 interchangeable with those conventionally used in conjunction with marine seismic sources, thereby enhancing the ease of their installation of such systems while minimizing cost. By reference to FIG. 1, one embodiment of the mounting bracket 12 of the present invention comprises a two piece assembly which is adapted to be secured to opposite ends of source 2 via conventional fasteners 13, e.g. a bolt and nut arrangement. Bracket 12 includes attachment flanges 15 which define transverse attachment bores designated 19. Bores 19 are receptive to spacing members 20 in the manner illustrated in FIGS. 2 and 3. By reference to FIG. 3, it is contemplated in a preferred embodiment of the invention that a two source system will incorporate an upper 20A and lower 20B spacing member about each end. The length of spacing members 20, and hence the distance between sources 2, is selected to optimize the "cluster effect" given operating parameters of volume, pressure and depth. Hence, the dimension of these members may vary.

Spacing members 20 are preferably made from a high strength, non corrosive metal, e.g. a high grade stainless steel, and defines two identical attachment ends 50. (See FIGS. 4–5) Attachment ends 50 are machined to varying diameters and dimensions to incorporate the shock absorption system of the invention, as will be described below. In the embodiment illustrated in FIGS. 3 and 4, the attachment end 50 of each spacing member 20 includes a smaller diameter shank 53 defining an arcuate shoulder 54, a pin 56 having a diameter less than said shank 53 and also defining an arcuate shoulder 57, and a still smaller diameter, threaded terminal end 59.

Attachment ends 50 of spacing elements 20 accommodate a shock absorption system 40 which upon assembly of all components is disposed between elements 20 and the energetic source, here seismic source 2, in order to dampen the torque and the axial displacement along element 20 resultant from the operation of said source. In a preferred embodiment, system 40 comprises two semirigid annular elements 31 and 32. Elements 31 and 32 are preferably comprised of an elastomeric compound, e.g. polyurethane, and define a bore therethrough to accommodate the outer diameter of shank 53. Element 31 fits in a pocket formed by shank 53 and shoulder 54, and is positioned by sliding element 31 over shank 53 during assembly. Element 32 fits in a pocket formed by pin 56 and cap element 60, as described below.

Resilient elements 31 and 32 are disposed on either side of a pivot element 34 formed of a very hard, non gallable material, e.g. bronze. Element 34 includes an arcuate outer surface 36 which defines a line contact with the inner bore 19 of flange 15 when assembled. In such a fashion, a controlled pivot between spacing member 20 and flange 15 is possible upon the application of torque caused by the actuation of one or more of sources 2. Pivot element 34 also includes a bore therethrough adopted to slidably fit about pin 56 against shoulder 57, as illustrated.

Figure 5:
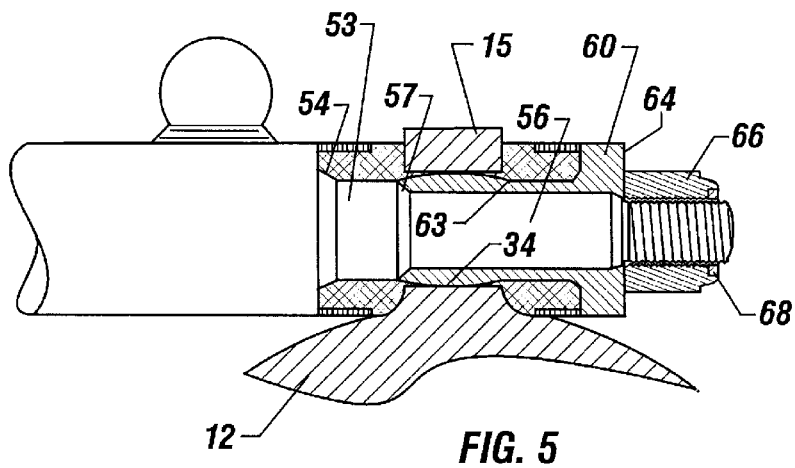
FIG. 5 illustrates a detailed view of a preferred embodiment of the shock absorbing means of the invention.

The deformation of elastomeric elements 31 and 32 at their outer edges is controlled during the actuation of sources 2 by an annular cap or cage 43 which is preferably comprised of a rigid material such as a high grade stainless steel. Cap 43 fits into an annular groove formed in each of elements 31 and 32 as illustrated in FIG. 5.

Elements 31, 32 and 34 are maintained in place about attachment end 50 by a cap element 60 which describes a tapered first end 63 and a flat contact face 64. End 63 is machined to define a very narrow contact face with pivot element 34, thereby promoting greater flexibility in movement of element 34 upon torquing caused by the actuation of source 2. Cap element 50 is in turn secured in place by a nut 66. In a preferred embodiment, nut 66 is provided with a nylon locking element 68 to secure nut in place and prevent loosening.

The shock absorption system 40 previously described is assembled by placing each constituent element about end 50, securing said elements, placing the now "loaded" end 50 through bore 19 and securing the placement of said end 50, and hence spacing element 20, by the application of fastener 66 as described above and prestressed by hand with the help of a standard wrench (not shown) until cap element 60 is positioned in an abutting relationship with pivot element 34.

Figure 6:
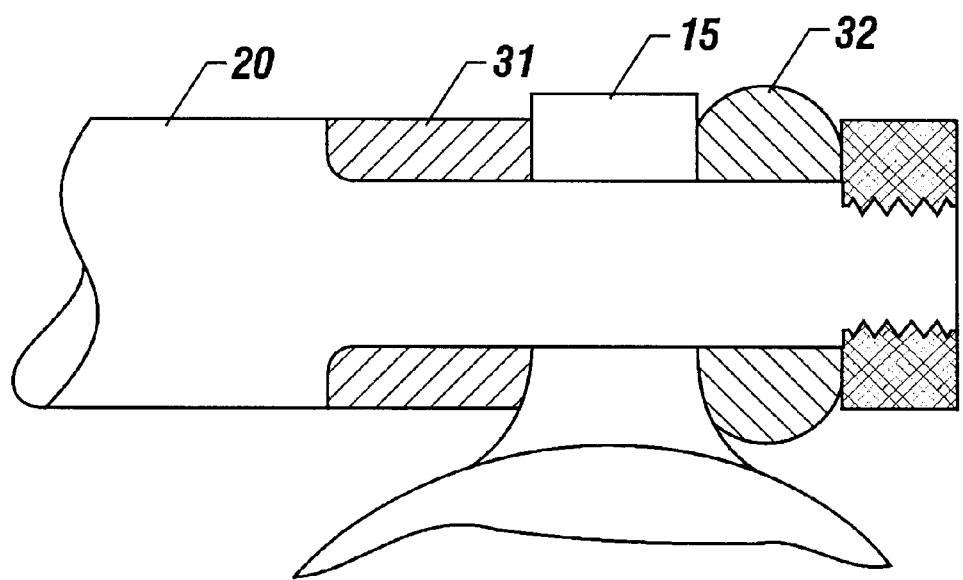
FIG. 6 illustrates a detailed view of a preferred embodiment of the shock absorbing means of the invention, upon resilient deformation by an explosive force.
Figure 7:
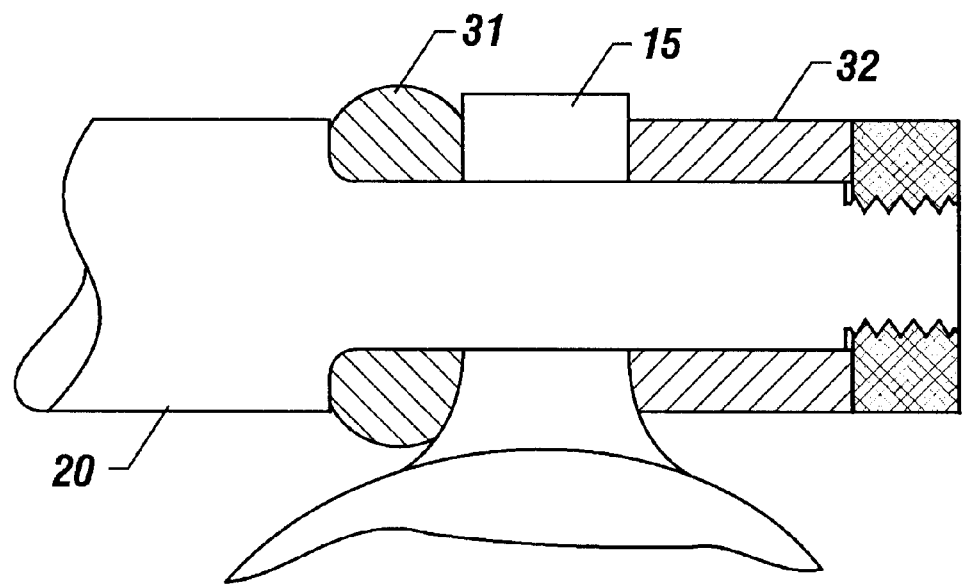
FIG. 7 illustrates a detailed view of a preferred embodiment of the shock absorbing means of the invention, upon resilient deformation by implosive force.

The performance of the system 40 during the actuation of sources 2 may be seen by reference to FIGS. 6–9. FIGS. 6–9 illustrate an alternate embodiment of system 40 which is substantially identical to that described above except for the absence of cap elements 43. FIG. 6 illustrates a detailed view of a spacing element 20, bracket 15 and system 40 when acted on by an explosive source such as when two sources 2 are fired simultaneously. In such a case, the pressure field in the water between the two sources 2 is greater than the field outside said sources 2, so that said sources 2 tend to move away from each other as illustrated in FIG. 6. In this example, resilient element 32, being at the outer edge of the field, is compressed as sources 2 attempt to move outwardly. Simultaneously, element 31 is decompressed. After several seconds, the pressure inside the bubble (not shown) becomes lower than hydrostatic pressure, the bubble reaches its maximum size and then collapses. Water rushes into the resulting void, forcing one source 2 against the other. During this implosive effect, as illustrated in FIG. 7, sources 2 are sharply urged together. As a result, element 31 is now compressed and element 32 is decompressed. No mechanical shock, however, occurs between spacing members 20 and sources 2 since energy is dampened by the shock absorbing system 40.

Figure 8:
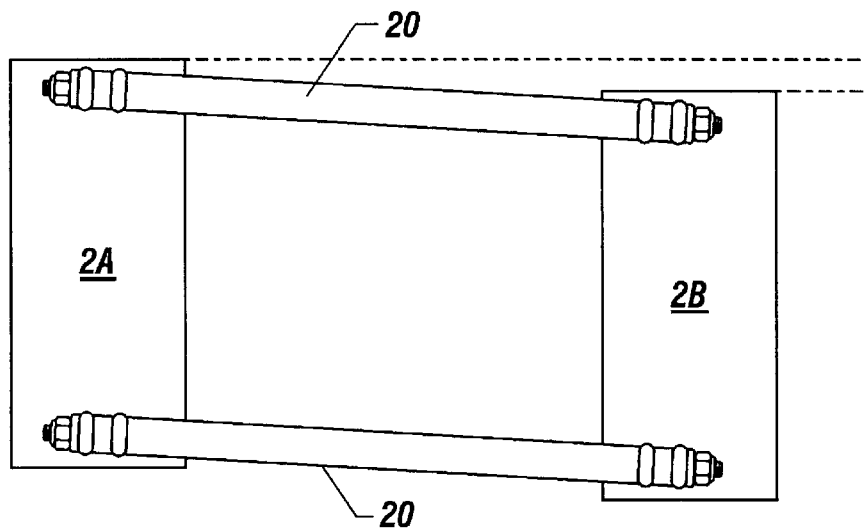
FIG. 8 is a top view of an embodiment of the invention upon the firing of a single seismic source.
Figure 9:
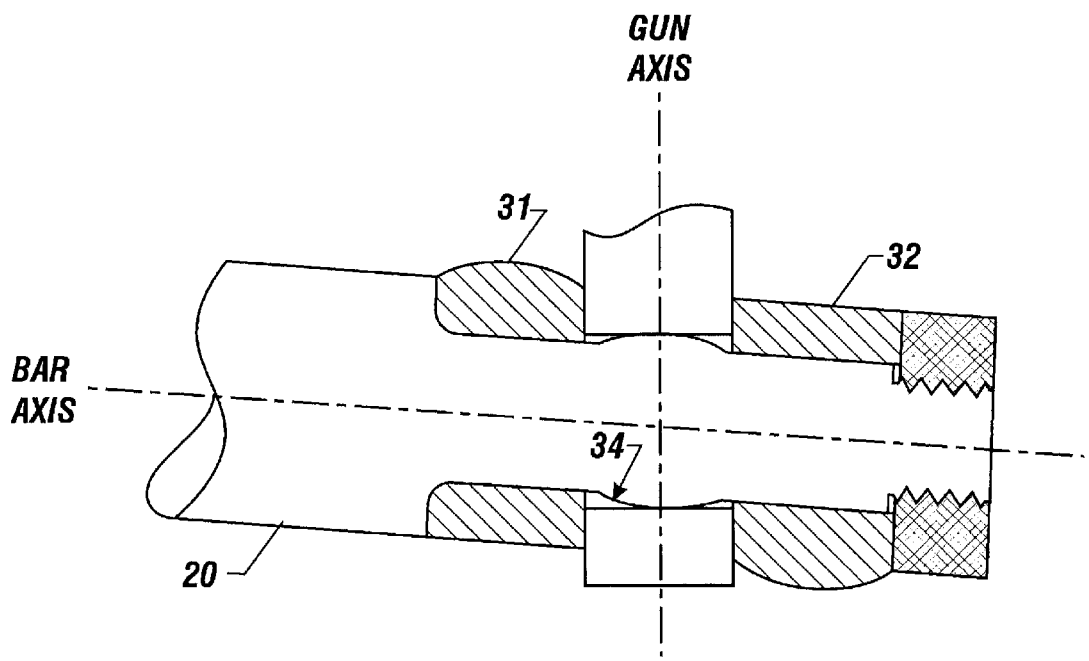
FIG. 9 is a side, detailed view of a preferred embodiment of the invention upon system deformation.

The dynamics involved in the actuation of only one source in a two source set-up may by seen by reference to FIG. 8. In FIG. 8, source 2B is actuated thereby creating an axial displacement. Sources 2A is not actuated and therefore experiences no such axial displacement. The shock absorption system 40 of the present invention allows for source 2B to momentarily pivot with respect to source 2A, with a corresponding deformation of the elastomeric elements, as described above. A detailed view of the dynamics of the temporary deformation of system 40 may be seen in FIG. 9. As illustrated, the arcuate outer surface of pivot element 34 allows movement of source 2 within bracket 15 subject to the deformation limits of elements 31 and 32.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A system to maintain two or more energetic sources at a spaced relation relative to each other, where said sources define a longitudinal axis and a first and second end, comprising:
    means attachable to each source, where said means includes a mounting member defining a bore transverse to said longitudinal axis;
    means to maintain said sources at a selected spaced relationship from each other, where said spacing means includes elements having terminal ends; and
    a mounting system attachable to the terminal ends of said spacing means, where said system includes at least one resilient member which is radially bounded by said mounting member, where said mounting system in combination with said spacing means is engageable to each of said sources.

2. The system of claim 1 where said mounting member includes a mounting bracket attachable at said first and second ends of said sources.

3. The system of claim 1 where said resilient member is formed from polyurethane.

4. The system of claim 3 where said resilient member includes a non-resilient cap to control deformation.

5. The system of claim 1 where said spacing means includes structural members defining machined terminal ends to accommodate said mounting system.

6. The mounting system of claim 1 further including a pivot member formed of a non gallable material.

7. The mounting system of claim 6 where said pivot member is formed from bronze.

8. A system to maintain two or more marine seismic sources at a spaced relation relative to each other during underwater operation comprising:
    a bracket attachable to said seismic sources, where said bracket includes a bore to receive a spacing system;
    said spacing system including at least two structural members adapted to be disposed between said sources and coupled to said brackets, where said members each define two terminal ends; and
    a mounting system attached to the terminal ends of said structural members, where said mounting system includes at least one resilient member which is adapted to be at least partially disposed in said bore of said bracket so as to define a contact surface.

9. The system of claim 8 further including a pivot means disposed about the terminal ends of said structural members and adapted to form a contact surface between said bracket and said spacing member where said pivot means defines an arcuate outer surface.

10. The system of claim 9 where said pivot means is received inside a bore formed in said bracket, where said pivot means defines a line contact area inside said bore.

11. The system of claim 8 where said terminal ends are threaded.

12. The system of claim 9 further including a cap element to maintain the lateral relationship of said pivot means and shock absorption system and a fastener threaded by receivable about said terminal end.

13. The system of claim 9 where said pivot member is formed of a hard, nongallable material.

14. The system of claim 9 where said pivot member is formed of bronze.

15. The system of claim 8 where said resilient members are formed of polyurethane.

16. The system of claim 8 where said resilient members include means to control radial deformation.

17. A system to maintain a substantially rigid, spaced relationship between two energetic energy sources comprising:
    clamping means securable to said sources;
    spacing means adapted to be disposed between said sources, where said spacing means includes first and second ends; and
    a dampening means comprising at least one resilient element disposed about said first and second ends of said spacing means and adapted to deform upon the movement of said sources, where said dampening means is adapted to be at least partially radially bounded by said clamping means.

18. The system of claim 17 further including an annular element disposed about said first and second ends of said spacing means where said annular element includes an arcuate outer surface.

19. The system of claim 18 where said annular element is receivable in a bore formed in said clamping means.

20. The system of claim 17 further including non-deformable radial elements disposed about a portion of the axial length of said resilient elements to control deformation.

21. The system of claim 18 where said annular element and said dampening means are maintained in an abutting, fixed relationship by a cap element and a fastener.

22. The system of claim 21 where said fastener is received about threaded first and second ends.

23. A spacing system for use with at least two acoustic sources each of which define a major axis, where said spacing system is adapted to maintain said sources in a spaced relationship such that said major axes are maintained in a substantially parallel orientation, said spacing system comprising:
    a frame comprised of at least two structural members where each said member defines a terminal end;
    one or more brackets adapted to be secured to said acoustic sources, where said brackets each include means to receive the terminal ends of the structural members; and
    at least one compressible element disposed about said terminal ends of said structural members such that movement of said structural member within said receiving means serves to temporarily deform said compressible element such the reestablishment of the compressible element serves to realign said sources such that their major axes reestablish an initial, substantially parallel orientation.

24. The spacing system of claim 23 wherein at least a portion of each compressible element is disposed about a respective terminal end of said structural members and within said corresponding receiving means.

25. The spacing system of claim 23 wherein said compressible element is comprised of plastic.

26. The spacing system of claim 23 wherein a first and second compressible member are separated by a spacer where said combination is disposed about said respective terminal end of said structural member and partially disposed within said receiving means such that said first member bounds said bracket toward the terminal end of the structural member.

27. The spacing system of claim 26 further including means to compress the first compressible element.

* * * * *